United States Patent Office 3,536,729
Patented Oct. 27, 1970

3,536,729
PROCESS FOR THE PURIFICATION OF 3-AMINO-5-METHYLISOXAZOLE
Charles William Den Hollander, Midland Park, N.J., assignor to Hoffmann-La Roche Inc., Nutley, N.J., a corporation of New Jersey
No Drawing. Filed June 30, 1967, Ser. No. 650,218
Int. Cl. C07d 85/22
U.S. Cl. 260—307    4 Claims

ABSTRACT OF THE DISCLOSURE

The purification of 3-amino-5-methylisoxazole by treatment with aqueous caustic solution and subsequent distillation of the aqueous phase is described. The 3-amino-5-methylisoxazole is prepared by a process which comprises the steps of (a) reacting 5-methylisoxazole with a tertiary alkyl compound, such as tertiary butyl alcohol, in the presence of a mineral acid, such as sulfuric acid, to yield N-t-butyl isoxazolium salt, (b) reacting the isoxazolium salt with hydroxylamine in the presence of a base, such as sodium hydroxide, to yield the 3-tertiary alkylamino-5-methylisoxazole, and (c) hydrolyzing said reaction product to yield the desired 3-amino-5-methylisoxazole. The intermediate 5-methylisoxazole utilized in the process is prepared by reacting an alkali metal hydroxymethylene acetone with hydroxylamine-N-sulfonic acid. The sequential intermediates 5 - methyl-isoxazole and 3-amino-5-methylisoxazole, are useful in the preparation of N'-(5 - methyl-3-isoxazolyl)sulfanilamide, a well-known antibacterial agent.

BACKGROUND OF THE INVENTION

Among the more efficacious processes for the preparation of 5-methylisoxazole is the one described in copending application Ser. No. 527,069, filed Feb. 14, 1966, now U.S. Pat. 3,391,154, issued July 2, 1968, wherein an alkali metal hydroxymethyleneacetone is reacted with hydroxylamine-N-sulfonic acid in an aqueous reaction medium in the absence of added acid. The 5-methylisoxazole thus produced can conveniently be utilized in the process described in copending application Ser. No. 446,103, filed Apr. 6, 1965, now U.S. Pat. 3,400,122, issued Sept. 3, 1968, to prepare 3-amino-5-methylisoxazole. Said process comprises (a) reacting 3-methylisoxazole, for example, with tertiary butyl alcohol in the presence of a mineral acid such as sulfuric acid, (b) reacting the reaction product obtained with hydroxylamine in the presence of a base, such as sodium hydroxide, and (c) subsequently hydrolyzing the 3-tertiary butylamino-5-methylisoxazole produced to yield the desired 3-amino-5-methylisoxazole. When the 3-amino-5-methylisoxazole thus produced is reacted with a p-amino or p-substituted benzyl sulfonyl halide in the presence of the required recovery solvent to prepare N'-(5 - methyl-3-isoxazolyl)sulfanilamide, it has been unexpectedly found that the solvent discolors. This discoloration is highly undesirable for various reasons, the most significant of which is the effect on the reusability of the solvent particularly in a continuous process. Conventional techniques such as purification of the 3-amino-5-methylisoxazole by crystallization have not been effective in eliminating the discoloration. Unexpectedly, by utilizing the herein described purification step in preparing the 3-amino-5-methylisoxazole, this undesirable discoloration is eliminated.

BRIEF SUMMARY OF THE INVENTION

In the process for the preparation of 3-amino-5-methylisoxazole by:

(a) reacting an alkali metal hydroxymethyleneacetone with hydroxylamine-N-sulfonic acid to yield 5-methylisoxazole;
(b) reacting the 5-methylisoxazole with tertiary-butyl alcohol in the presence of an acid to yield an N-t-butyl isoxazolium salt;
(c) reacting the N-t-butyl isoxazolium salt with hydroxylamine in the presence of a base; and
(d) hydrolyzing the 3-tert-butylamino-5-methylisoxazole formed to yield a reaction mixture of 3-amino-5-methylisoxazole, the improvement which comprises treating said reaction mixture of 3 - amino-5-methylisoxazole with an aqueous caustic solution, distilling the aqueous phase and thereafter recovering the 3-amino-5-methylisoxazole.

DETAILED DESCRIPTION OF THE INVENTION

It is known and desirable to prepare the antibacterial N'-(5-methyl-3-isoxazolyl)sulfanilamide from 3-amino-5-methylisoxazole. Thus, from the view point of improving yields and purity, much effort and time has been expended on the preparation of 3-amino-5-methylisoxazole and its precursor, 5-methylisoxazole.

Among the more useful and efficient processes developed to date for the preparation of the intermediate 5-methylisoxazole has been the one described in copending application Ser. No. 527,069, filed Feb. 14, 1966, wherein an alkali metal hydroxymethyleneacetone is reacted with hydroxyamine-N-sulfonic acid. An outstanding advantage of the process is the reduction of the amount of undesired 3-methylisoxazole to less than 1 percent. The process will be further illustrated hereinafter in Example 1.

Among the more useful and efficient processes for the preparation of 3-amino-5-methylisoxazole is the process described in copending U.S. patent application Ser. No. 446,103, filed Apr. 6, 1965, which may be exemplified by the following reaction scheme:

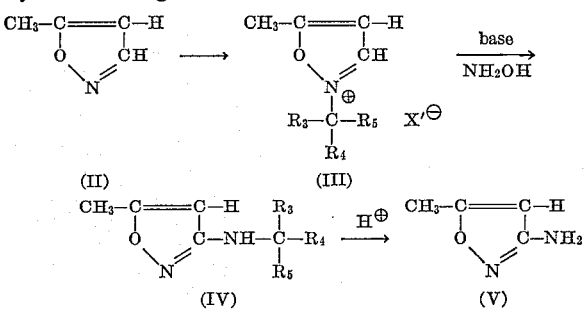

wherein $R_3$, $R_4$ and $R_5$ are lower alkyl, preferably methyl.

The conversion of the isoxazole of Formula V to the useful end product N'-(5-methyl-3-isoxazolyl)sulfanilamide (I) may be illustrated as follows:

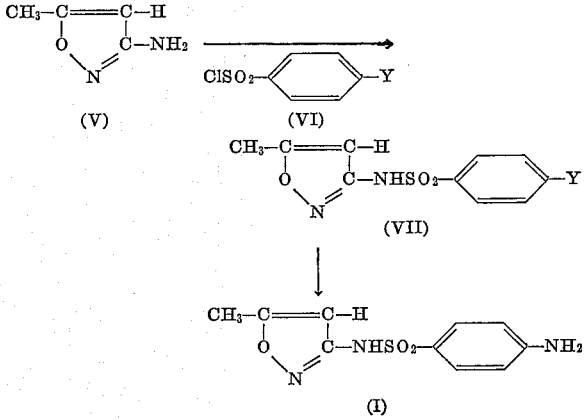

wherein Y is an amino group or an amino group precursor, e.g., a group which can be converted to an amino group through reduction or hydrolysis, for example, nitro, nitroso, carbalkoxyamino, carbobenzyloxyamino group, and the like, or preferably an arylamido group, for example, an alkanoylamido, preferably a lower alkanoylamido, e.g., acetamido, propionylamido, etc., or benzamido or substituted benzamido e.g., alkyl or halo-substituted benzamido.

The compound of Formula I is useful in the treatment of bacterial infections, such as those caused by *E. coli*, pneumococci, Streptococci and the like.

The above reaction sequences are carried out by reacting a substituted isoxazole of Formula II with either a tertiary alkyl compound having the formula

wherein X is I, Cl, Br, OH, $ClO_4$, or a lower alkosulfate or with isobutylene in the presence of a mineral acid, e.g., sulfuric phosphoric etc., or an arylsulfonic acid, e.g., benzenesulfonic acid, p-toluenesulfonic acid, etc., to form a compound of Formula III. When X is I, the reaction can be carried out without the presence of a mineral or arylsulfonic acid. X' in Formula III is either X when a compound of the formula

is employed or when isobutylene is employed represents the anion of the mineral acid used therewith. The compound of Formula III is then reacted with hydroxylamine in the presence of a base, e.g. an alkali metal hydroxide such as sodium hydroxide, potassium hydroxide, etc., an alkali metal carbonate or bicarbonate such as sodium bicarbonate, or an aliphatic tertiary amine such as a triloweralkylmine, e.g., triethylamine, trimethylamine, etc., to form a compound of Formula IV. The compound of Formula IV is then treated with a mineral acid, e.g., hydrochloric, hydrobromic, hydroiodic, sulfuric, etc., with hydrochloric acid preferred, to form a 3-aminoisoxazole of Formula V. The 3-aminoisoxazole of Formula V is then converted to the sulfonamide of Formula I according to known procedures, i.e., reacting a compound of Formula IV with a substituted benzenesulfonyl chloride of Formula VI to form a compound of Formula VII. The Y group in the compound of Formula VII is then converted to an amino group by known procedures, i.e., hydrolysis or hydrogenation depending on the nature of the Y group. The compound of Formula I can be recovered by conventional means such as extraction with methylene chloride.

When the 3-amino-5-methylisoxazole, prepared according to the procedures hereinbefore described, is converted on a commercial scale to N'-(5-methylisoxazolyl)sulfanilamide in the presence of required recovery solvent, such as pyridine, picoline, acetone, methylene chloride and the like, as hereinbefore described, said solvent acquires an undesirable color. It has now been unexpectedly discovered that if the 3-amino-5-methylisoxazole, prior to recovery, is treated with an aqueous caustic solution containing from about 10 to 90 percent of a caustic such as sodium hydroxide, potassium hydroxide, or the like, at a temperature of from 50 to 150°, preferably from 80 to 120° for about 15–60 minutes, and the resulting aqueous phase is removed by distillation, the 3-amino-5-methylisoxazole recovered does not discolor the solvent utilized in the conversion step to the desired sulfonamide. Furthermore, the 3-amino-5-methylisoxazole thus produced reacts almost quantitatively with the compound carrying a p-amino or p-substituted benzene sulfonyl halide.

The following examples are illustrative. All temperatures are in degrees centigrade, unless otherwise mentioned.

EXAMPLE 1

Preparation of 5-methylisoxazole

A one-liter round-bottom flask, equipped with reflux condenser, thermometer, stirrer, and dropping funnel, was charged with 500 milliliters of methylene chloride and 54 grams of sodium methoxide. To the resulting suspension was added dropwise 60 grams of methyl formate over a 30-minute period while maintaining the reaction temperature at 25–30° by cooling. The reaction mixture was stirred for an additional 10 minutes and then 87 grams of acetone were added dropwise over a 30-minute period while again maintaining the reaction temperature at 25–30°. After holding the reaction mixture at 25–30° overnight, 100 milliliters of water were added to dissolve the sodium hydroxymethyleneacetone which had formed. The aqueous and organic phases were separated and the methylene chloride phase was washed with three 50-milliliter portions of water. The aqueous extracts were combined, giving a total volume of 450 milliliters of aqueous sodium hydroxymethyleneacetone.

A two-liter round-bottom flask, equipped with stirrer, distillation column and condenser, was charged with 775 grams of an aqueous solution containing 14.6 percent hydroxylamine-N-sulfonic acid. To this solution was added at room temperature (25–26°) 450 milliliters of the aqueous solution prepared as described above over a 5-minute period while stirring the mixture. After the solution had been added, the reaction mixture was rapidly heated, with boiling beginning at about 65–70°. Heating was continued for about one hour and 10 minutes, during which time the vapor temperature had reached 100° and 600 milliliters of a 5-methylisoxazole/water distillate had accumulated.

To this distillate was added 100 grams of sodium chloride and the resulting solution was extracted with 75 milliliters of methylene chloride followed by four 50-milliliter portions of methylene chloride. The methylene chloride extracts were combined and the methylene chloride distilled off. The remaining residue was then fractionally distilled and the fraction distilling at 116–122° was collected. This fraction weighed 57.8 grams and contained 98.3 percent 5-methylisoxazole, corresponding to a yield of 68.4 percent based on methyl formate. This procedure was repeated five additional times. The average analysis of the 116–122° fraction was 98.3 percent 5-methylisoxazole, 1 percent 3-methylisoxazole, and 0.7 percent methanol and methylene chloride.

EXAMPLE 2

Preparation of 3-amino-5-methylisoxazole

A mixture of 0.85 gram of predominantly 5-methylisoxazole, prepared according to the procedure of Example 1, and 1.85 grams of tert. butyl iodide was placed in a test tube and heated in an oil bath at 90–95° during about 40 minutes. During this interval it was noted that the inside temperature rose a few degrees above the bath temperature. On cooling, the mixture solidified for the most part, and it was digested with 5 ml. of dry ether, dried in vacuo, digested with 5 ml. of ethyl acetate, and finally washed with the latter solvent. In this manner 2.03 g. of the quaternary iodide, melting point 105–108°, was obtained. The product was crystallized from ethanol/ethyl acetate, melting point 107–110°.

A mixture of 20.6 g. of 2-tert, butyl-5-methylisoxazolium iodide, 5.4 g. of hydroxylamine hydrochloride and 70 ml. of water was stirred and cooled in an ice bath, and approximately 23 g. of 25 percent (w./w.) aqueous sodium hydroxide was added during 40 minutes at 5–6°, when a pH of about 7 was attained. On continued stirring and cooling, during about one hour, a thick precipitate was obtained. The ice bath was removed and the temperature allowed to rise to 20.5° during 50 minutes. The mixture was then stirred on the steam bath for 20 minutes during which a temperature of 85–89° was obtained for the most part. On cooling, filtration, and drying 8.48 g. of brownish 3-tert. butylamino-5-methylisoxazole, melting point 100–102.5°, was obtained. Crystallization from 20 cc. of 50 percent (v./v.) ethanol/water gave 7.98 g. of crystals, melting at 102–103°.

A mixture of 20.0 g. of 3-tert. butylamino-5-methylisoxazole and 160 ml. of 6 N hydrochloric acid was placed in a 500 ml. flask, which was provided with a condenser and a trap adapted for the return of aqueous layer and continuous removal of tert. butyl chloride. The flask was then heated in an oil bath, which was brought to a temperature of 135° in 18 minutes. At this temperature distillation of tert. butyl chloride had begun. Heating was continued, while the temperature of the oil bath was gradually raised to 150° during 30 minutes, and 9.5 ml. of tert. $C_4H_9Cl$ was collected. The reaction was immediately quenched by cooling the mixture below 10° in an ice bath. The mixture was then neutralized with stirring by cautious, portionwise addition of 77.4 g. of sodium bicarbonate during 32 minutes. No further cooling was necessary, when this step was carried out immediately. The mixture was allowed to warm to 21° with stirring and then extracted three times with 60 ml. of ethyl acetate. After drying with sodium sulfate the solvent was removed at reduced pressure in an evaporator with gentle heating below 37° by means of a water bath. Further pumping in a vacuum desiccator (provided with KOH) gave 10.98 g. of residue, melting at 59–61° with some sintering at 57°. This material was dissolved in 22 ml. of hot benzene and allowed to crystallize for 1 hour at room temperature and 3 hours in the refrigerator. In this manner 10.38 g. of recrystallized 3-amino-5-methylisoxazole was obtained; melting point 61–62.5° with sintering at 59°.

EXAMPLE 3

Purification of 3-amino-5-methylisoxazole 50 grams of 3-t-butyl amino-5-methylisoxazole, prepared according to the procedure of Example 2, were added to 200 ml. of water and 200 ml. of concentrated hydrochloric acid. With good agitation, the mixture was rapidly heated to 100°. At about 65–70°, tertiary butyl chloride began to distill and continued until the vapor temperature reached 98–100°. The reaction was cooled slightly to 80° and 100 grams of sodium hydroxide dissolved in 150 ml. of water were added. The heat of neutralization increased the temperature to about 100°. The reaction mixture was refluxed for ½ hour and then cooled to room temperature. During the refluxing period, about 25 ml. of water were removed by distillation. Thereafter, the 3-amino-5-methylisoxazole was extracted with 6 portions of 75 ml. each methylene chloride.

EXAMPLE 4

Preparation of $N^1$-(5-methyl-3-isoxazolyl)sulfanilamide

A solution of 3.60 g. of 3-amino-5-methylisoxazole, 8.0 g. of N-acetylsulfanilyl chloride and 20 ml. of dry pyridine was allowed to stand for 1 hour during which the temperature rose to 57°. Addition of 40 ml. of water gave a crystalline precipitate which was filtered after 1 hour, washed with water, and dried first in a vacuum desiccator over KOH and then in an oven at 60°. The acetylsulfanilamide weighed 8.40 g. and melted at 220–222.5° d. An additional 0.56 g., melting point 223–225° d., was obtained from the filtrate. Total yield=8.96 g. of $N^4$-acetyl-$N^1$-(5-methyl-3-isoxazolyl)sulfanilamide.

A mixture of 5.0 g. of the acetylsulfanilamide and 25 ml. of 10 percent aqueous sodium hydroxide was stirred and heated on the steam bath for 1 hour at 94–97°. After cooling to room temperature, 4.5 ml. of acetic acid was added to precipitate the free sulfa drug. The mixture was cooled in an ice bath for 30 minutes and filtered. After washing with water and drying, the product, $N^1$-(5-methyl-3-isoxazolyl)sulfanilamide, weighed 4.16 g. and melted at 166–169°.

What is claimed is:

1. In the process for the preparation of 3-amino-5-methylisoxazole by:
    (a) reacting an alkali metal hydroxymethyleneacetone with hydroxylamine-N-sulfonic acid to yield 5-methylisoxazole;
    (b) reacting the 5-methylisoxazole with tertiary-butyl alcohol in the presence of an acid to yield an N-t-butyl isoxazolium salt;
    (c) reacting the N-t-butyl isoxazolium salt with hydroxylamine in the presence of a base; and
    (d) hydrolyzing the 3-tert.-butylamino-5-methylisoxazole formed to yield a reaction mixture of 3-amino-5-methylisoxazole.

the improvement which comprises treating the reaction mixture of 3-amino-5-methylisoxazole with an aqueous caustic solution, distilling the aqueous phase and thereafter recovering the 3-amino-5-methylisoxazole.

2. A process according to claim 1 wherein the caustic solution is a sodium hydroxide solution.

3. A process in accordance with claim 2 wherein the 3-amino-5-methylisoxazole is treated with the aqueous sodium hydroxide solution at a temperature in the range of 50–150°.

4. A process in accordance with claim 3 wherein the 3-amino-5-methylisoxazole is recovered by extraction with methylene chloride.

References Cited

UNITED STATES PATENTS 3,073,839    1/1963    Kano et al. _____ 260—307

ALTON D. ROLLINS, Primary Examiner